(12) United States Patent
Hodge et al.

(10) Patent No.: US 7,527,436 B2
(45) Date of Patent: May 5, 2009

(54) FERRULE WITH TILT CORRECTION

(75) Inventors: Malcolm H. Hodge, Chicago, IL (US);
IIya Makhlin, Wheeling, IL (US);
Barbara Grzegorzewska, Chicago, IL (US)

(73) Assignee: Molex Incorporated, Lisle, IL (US)

( * ) Notice: Subject to any disclaimer, the term of this patent is extended or adjusted under 35 U.S.C. 154(b) by 146 days.

(21) Appl. No.: 10/894,092

(22) Filed: Jul. 19, 2004

(65) Prior Publication Data
US 2006/0013538 A1   Jan. 19, 2006

(51) Int. Cl.
*G02B 6/36* (2006.01)
(52) U.S. Cl. ........................................ 385/82
(58) Field of Classification Search ................ 385/82
See application file for complete search history.

(56) References Cited

U.S. PATENT DOCUMENTS 6,669,377 B2 * 12/2003 Barnes et al. ................. 385/78
2003/0161584 A1 * 8/2003 Ohtsuka et al. ............... 385/60

* cited by examiner

*Primary Examiner*—Jerry T Rahll

(57) ABSTRACT

A ferrule for connecting a optical fiber to a mating optical fiber or an item of network gear includes a guide hole having a consistent first dimension in a first region and a larger dimension in a second region. A guide or alignment pin inserted through the guide hole forms a locational or sliding fit with the guide hole in the first region and a loose fit in the second region, allowing the ferrule to rock through the angle formed by the dimension of the second region. Rocking the ferrule through this angle closes the lossy air gap formed by end-face tilt resulting from imperfect polishing of the face of the ferrule and decreases insertion loss.

17 Claims, 3 Drawing Sheets

FERRULE WITH TILT CORRECTION

FIELD OF THE INVENTION

This invention is generally directed to a multichannel ferrule for connecting optical fibers to a mating ferrule in which end tilt is corrected.

BACKGROUND OF THE INVENTION

Optical fibers are used to transmit data by transmitting electromagnetic radiation. The optical fibers are generally made of a glass or plastic core and enclosed in a cladding with a lower refractive index. The optical fibers transmit light through their length by internal reflections. The transmitted light can be modulated to transmit a signal, either analog or digital. Optical fibers can therefore be used to carry audio signals or data signals within a network.

Optical fibers are housed within a connector to mate one or more of the optical fibers to another optical fiber or set of optical fibers, or to a data-generating or data-using item of network gear. The connector may be formed of a ferrule which holds the optical fibers. The end face of the ferrule mates with the end face of a mating ferrule, to align each optical fiber with a corresponding optical fiber in the mating ferrule, to achieve transmission of signal through the optical fibers to the optical fibers of the mating ferrule.

The termination must protect against light loss, which is caused by a number of factors. In general, the more perfect the alignment between two optical fibers, the less light loss occurs at the connection. Light loss can arise from an air gap between two mating optical fibers or from a lack of alignment between two mating optical fibers. (Light loss can also arise from dirt on the optical fiber ends or from a rough surface on the optical fiber ends. These problems are generally addressed by cleaning the optical fibers during installation and by polishing the optical fibers.)

An air gap between two optical fibers causes Fresnel reflection, caused by the change in refractive index between the glass optical fiber and the air. The light reflected in this manner is lost in transmission. Improper alignment causes directional loss, when light propagating out of one optical fiber does not all enter the mating optical fiber and therefore does not transmit further. It is desirable to minimize the amount of light lost in transmission, whether by Fresnel reflection or by directional loss. As devices use more and more data, at faster and faster rates, the need to minimize the amount of light lost at an optical fiber termination becomes even more important.

An MT ferrule is a plastic member carrying multiple optical fibers, usually used for predetermined cable assemblies. The optical fibers are usually positioned in a plane. Two bores or guide holes in the ferrule are aligned parallel to the optical fibers and in the same plane. The bores or guide holes have a consistent dimension along the entire length thereof. Guide or alignment pins extend through the guide holes of the ferrule and into corresponding guide holes of the mating ferrule to keep the ferrule properly aligned. The guide or alignment pins are constructed to form an interference fit into the guide holes of the ferrule and to form an interference fit with the corresponding guide holes of the mating ferrule, to keep the ferrule securely linked to the mating ferrule and to keep each optical fiber aligned to its corresponding optical fiber in the mating ferrule. The secure link also protects against dirt, moisture, vibrations, shock, electromagnetic interference, and radio frequency interference.

End-face tilt is the angle formed by the imperfect alignment of the facial plane of the ferrule with the facial plane of the mating ferrule. The facial plane of the MT ferrule, perpendicular to the plane in which the optical fibers are arranged, is polished to minimize end-face tilt (as well as to clean the optical fibers and to smooth the surface of the ends of the optical fibers). Polishing is a difficult operation and some end-face tilt will always result, as it is difficult to achieve a perfectly flat facial plane by polishing. End-face tilt is illustrated in FIGS. 1a and 1b, which show two MT ferrules 2 and 4 mated in, respectively, the x axis (width) and the y axis (depth). The end faces 6 and 8 of the two ferrules 2 and 4 do not align perfectly, leaving a gap 10 in the x axis and 12 in the y axis, between the two end faces 6 and 8.

Optical transmission of light through the optical fibers of the MT ferrule is optimized when the end-face tilt is less than 0.03 degrees. Commercial polishers, however, can only achieve end-face tilt of 0.2 degrees. This amount of end-face tilt has a tremendous impact on ferrule performance, as it causes significant insertion losses. An off-square facial plane of an MT ferrule creates an air gap between the mating optical fibers, which leads to Fresnel reflection as described above. This lossy gap between two facial planes, caused by end-face tilt, causes loss of light, and therefore loss of data, at the interface of the MT ferrule and the mating ferrule. Higher end-face tilt causes increasingly higher insertion losses.

The guide or alignment pins must fit tightly in order to prevent offset of the lateral optical fiber-to-optical fiber alignment, and the tight fit of the guide or alignment pins in the guide holes prohibits any rotation of the ferrule to accommodate end-face tilt.

Accordingly, a need exists for a way to connect an MT ferrule to another ferrule that minimizes the air gap caused by end-face tilt, but preserves alignment of the optical fibers.

SUMMARY OF THE INVENTION

A ferrule that compensates for end-face tilt by changing the geometry of the guide or alignment pins in the guide holes is provided. The ferrule of the preferred embodiment includes guide holes that are of consistent dimension in a first region proximal to the facial plane, and tapered radially outward in a second region distal to the first region. In another embodiment, the second region has a consistent, second dimension which is larger than the dimension of the first region. In the preferred embodiment, the first region is approximately one-fourth of the total length of the guide hole. The guide or alignment pins form sliding or locational fits with the guide holes in the first region, keeping the ferrule tightly connected to the mating ferrule and restricting lateral movement. The ferrule can rock rotationally in the second region and thereby decrease the lossy air gap formed by end-face tilt.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

Figure 1A:
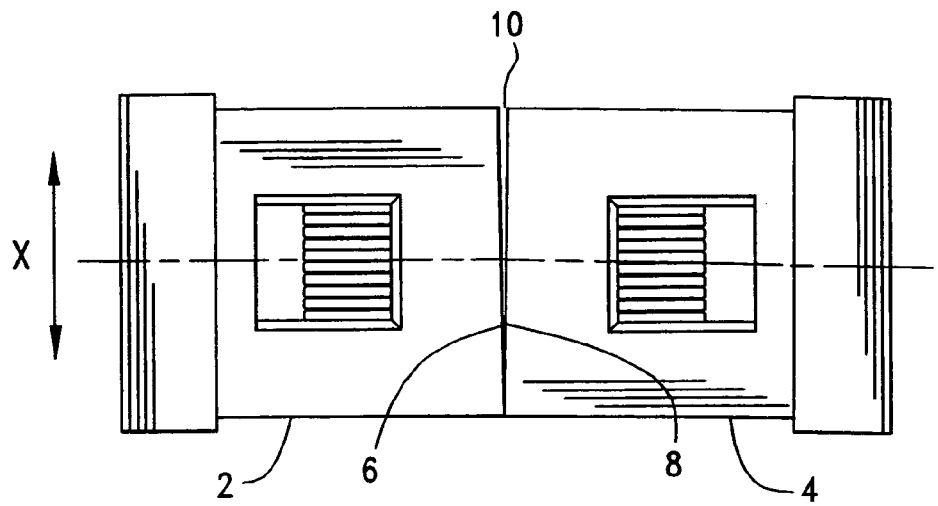
FIG. 1a is a plan view of two mated prior art MT ferrules, showing the gap resulting from end-face tilt in the x direction.
Figure 1B:
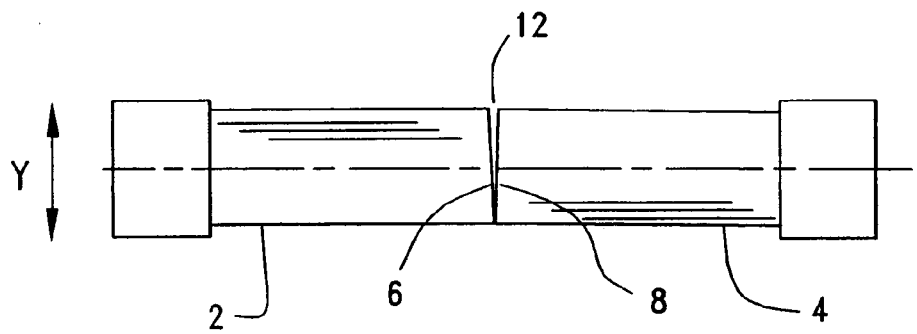
FIG. 1b is a side view of two prior art mated MT ferrules, showing the gap resulting from end-face tilt in the y dimension.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
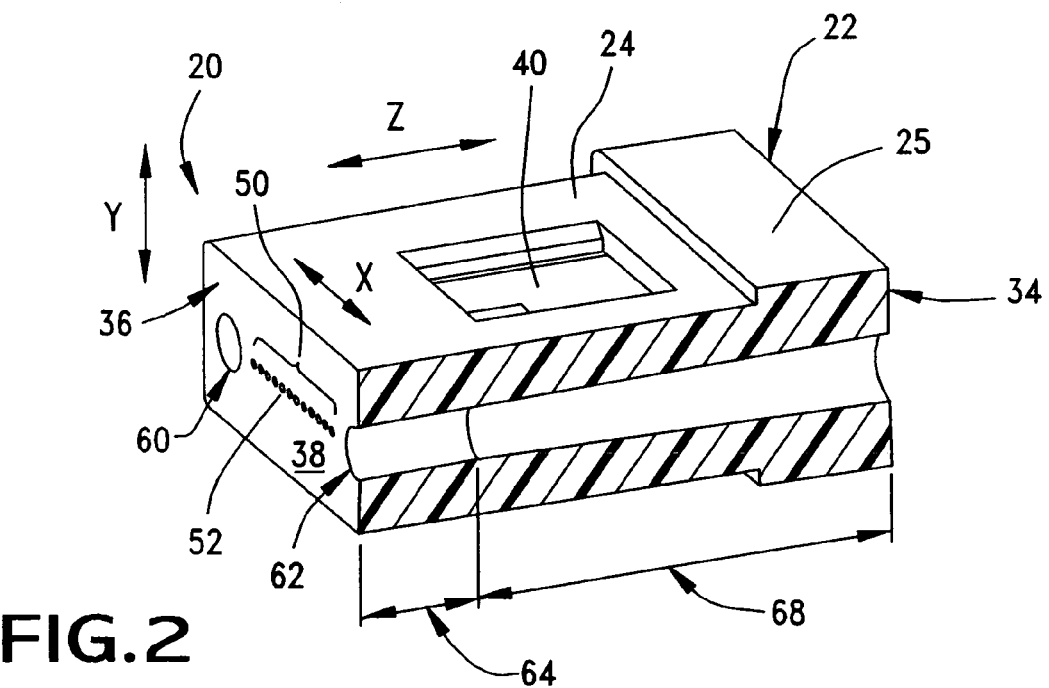
FIG. 2 is a perspective view of an MT ferrule which incorporates the features of the present invention with a cutaway illustrating a guide pin hole.

FIG. 2 shows an MT ferrule 22 of the preferred embodiment of the present invention. The ferrule 22 includes a body 24 which has a width x, a depth y, and a length z. The body 24 is preferably formed of plastic. The body 24 has a top 26 and a bottom 28, both in the x-z plane, and two sides 30 and 32, both in the y-z plane. The body has a distal end 34 and a proximal end 36, both in the x-y plane. The proximal end 36 is formed of a planar end face 38. The body 24 has a shoulder 25 extending outwards from the top 26, bottom 28, and sides 30 and 32, at the distal end 34.

A plurality of spaced-apart passageways 52 extend through the body 24 from the distal end 34 to the proximal end 36 of body 24. An optical fiber 50 is carried in each respective passageway 52 and terminates at the end face 38. Preferably, twelve (12) optical fibers are provided. The optical fibers 50 are preferably glass or plastic used to transmit light. The body 24 is illustrated in FIG. 2 with an aperture 40 to show the placement of the optical fibers 50 within passageway 52. In use, the aperture 40 would be filled with epoxy or any adhesive.

Two guide holes 60 and 62 extend through the body 24 from the distal end 34 to the proximal end 36 and are used to align the ferrule 22 with a mating ferrule. The passageways 52 extend between the guide holes 60 and 62, and in the same plane as the guide holes 60 and 62. Guide hole 62 is shown cut away in FIGS. 2, 3a, and 3b to reveal its internal geometry. The guide hole 62 has a longitudinal first region 64 with a first dimension 66, consistent throughout the extent of the first region 64. The first region 64 extends from the end face 38 into body 24, where first region 64 meets with a longitudinal second region 68 which extends from first region 64, through body 24, to the distal end 34. The dimension of the guide hole 62 in the second region 68 is greater than the first dimension 66. In the preferred embodiment, the second region 68 gradually tapers radially outward from the first dimension 66 to the distal end of the body 24. In the preferred embodiment, the first region 64 is approximately one-fourth of the total length of the guide hole 62. The guide hole 62 is identical to the guide hole 60 in the preferred embodiment.

Figure 4A:
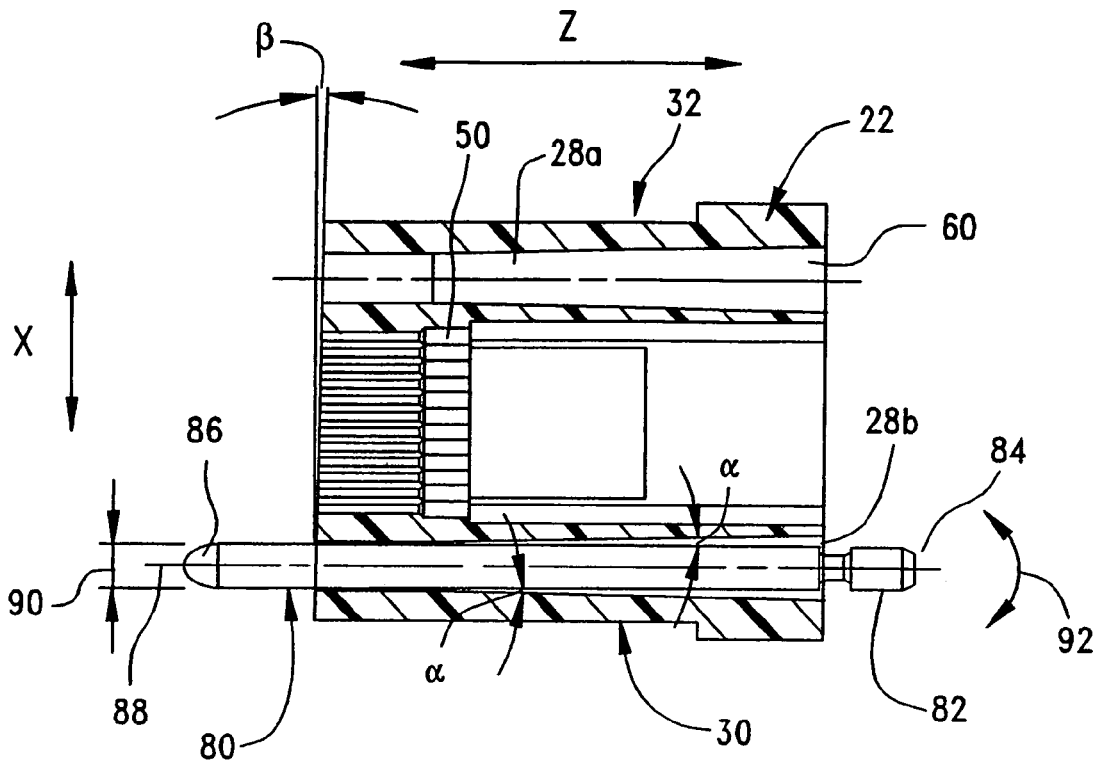
FIG. 4a is a cross-sectional view of a ferrule and a guide or alignment pin of an MT ferrule of an embodiment of the present invention.
Figure 4B:
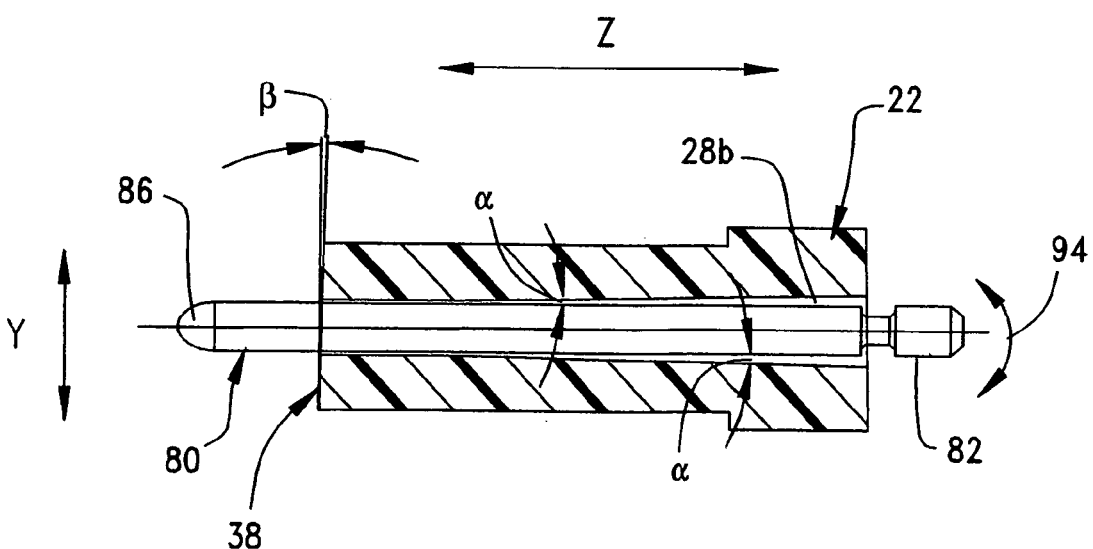
FIG. 4b is a cross-sectional view of the ferrule and a side view of one guide or alignment pin of an MT ferrule of an embodiment of the present invention.

FIGS. 4a and 4b show the MT ferrule 22 with a guide or alignment pin 80 inserted in guide hole 62. In use, an identical guide or alignment pin 80 is inserted in guide hole 60. The guide or alignment pin 80 of the preferred embodiment, as depicted, is cylindrical and preferably includes a grooved rear portion 82 at a second end 84 for ease of holding the pin inside the connector, and a rounded point 86 at a first end 88 for ease of insertion into a guide hole 60 or 62. The alignment pin 80 is constructed to extend into and form a sliding or locational fit in the guide holes 60 and 62, as hereinafter described, and through the body 24 into a corresponding guide hole of a mating ferrule, where it forms a fit with the corresponding guide hole, to keep the MT ferrule 22 securely linked to the mating ferrule and to keep each optical fiber 50 aligned to its corresponding optical fiber in the mating ferrule.

Also depicted in FIGS. 4a and 4b is the angle $\beta$, caused by the imperfect polishing of the end face 38. The dimension of and orientation of the angle $\beta$ depends on the imperfection in the polishing of the end face 38. In FIG. 4a, the angle $\alpha$ is formed around the z-axis thereby forming a conical surface. In FIG. 4b, the angle $\alpha$ is formed around the z-axis.

The guide holes 60 and 62 of the preferred embodiment are circular in cross-section and the guide or alignment pin 80 of the preferred embodiment is a cylinder. In another embodiment, the guide holes 60 and 62 are passageways through body 24 and have circular cross-sections. However, the cross-sections of the guide holes 60 and 62 and the guide or alignment pin 80 could be square, oval, star-shaped, or any other shape that a skilled user chooses to achieve the same object of the invention.

The outer dimension 90 of the guide or alignment pin 80 of the preferred embodiment is selected to form a sliding or locational fit with the first region 64 of the guide hole 62.

Figure 3A:
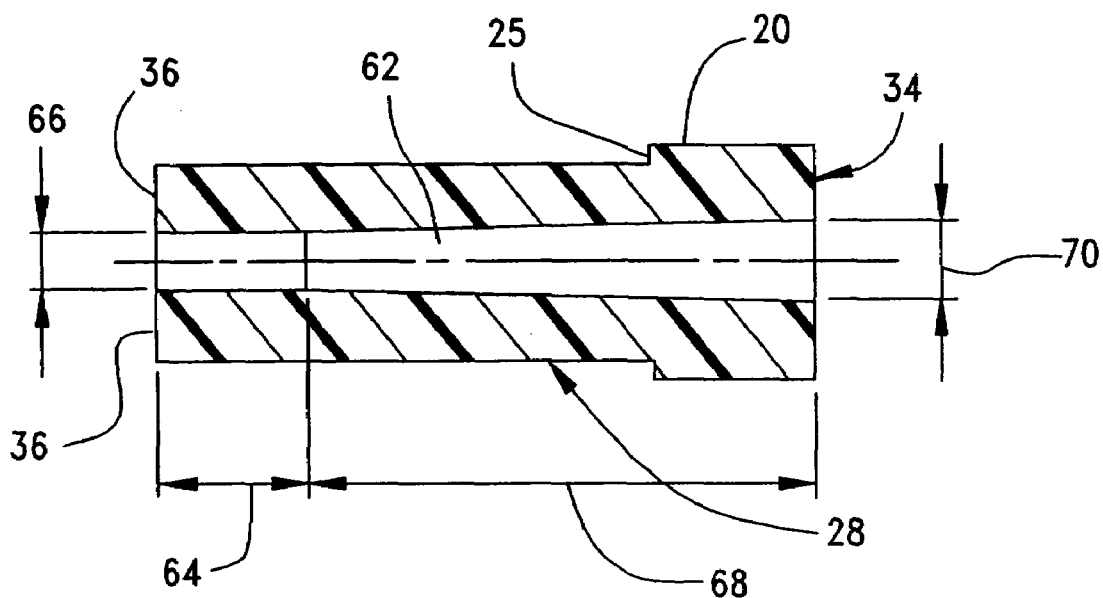
FIG. 3a is a cross-sectional view of one embodiment of an MT ferrule of the present invention.

Because of the gradual taper in the preferred embodiment of guide hole 62 from the first dimension 66 to the second dimension 70 in the second region 68, as depicted in FIG. 3a, an angle $\alpha$ is created between the guide or alignment pin 80 and the guide hole 62. Preferably, the degree of taper in the second region is selected so that preferably the angle $\alpha$ equals or exceeds the angle $\beta$. It is to be noted that although not optimal, the angle $\beta$ could also be greater than the angle $\alpha$, and would still improve overall performance.

Figure 3B:
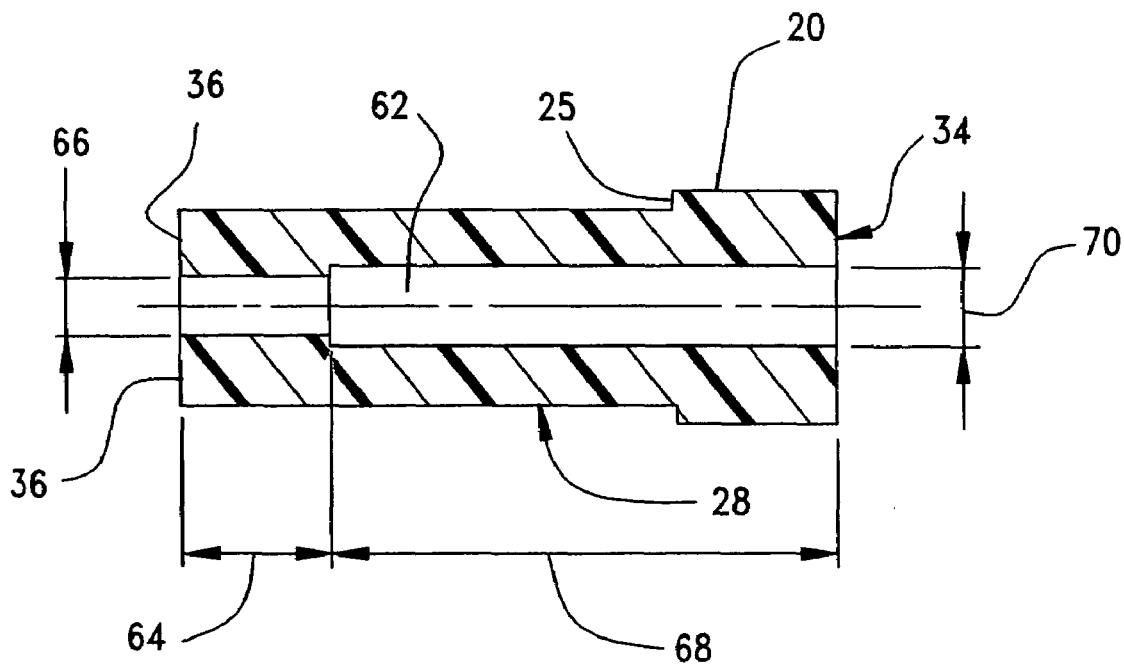
FIG. 3b is a cross-sectional view of another embodiment of an MT ferrule of the present invention.

In an alternative embodiment, as depicted in FIG. 3b, the second region 68 has second dimension 70 throughout the extent of its length from the first region 64 to the distal end 34. In this embodiment, instead of a gradual taper, there is an abrupt transition from the first dimension 66 in the first region 64 to the second, larger dimension 70 in the second region 68.

Because the guide or alignment pin 80 is loose within the guide hole 62 during the three-quarters of its length because of the second region 68, the ferrule 22 can rock through angle $\alpha$ in either of the illustrated embodiments. By pressing the ferrule 22 against the mating ferrule, the MT ferrule 22 can be rocked through the angle $\alpha$, thereby closing the lossy air gap 10 or 12 or both between the end face 38 of the MT ferrule 22 and the mating ferrule. As a result, insertion loss is substantially decreased.

Since the angle $\alpha$ can exist 360 degrees around the guide or alignment pin 80, the ferrule 22 can be rocked along its conical axis to close the angle $\beta$ wherever it exists. In FIG. 4a, line 92 illustrates how the guide or alignment pin 80 can rock through the angle $\alpha$ in either direction in the x-z plane. In FIG. 4b, line 94 illustrates how the guide or alignment pin 80 can rock through the angle $\alpha$ in either direction in the y-z plane. It should be noted that since the hole is conical, the pin 80 can rock in an an almost unlimited number of directions.

Once the ferrule 22 has been rocked through the angle $\alpha$ to close the lossy air gap 10 or 12, the connector spring keeps the ferrule 22 in that closed position. Additionally, the same fit prevents the end face 38 of the ferrule 22 from moving outside its tolerance, thereby preserving alignment of the optical fibers 50 with the mating optical fibers and preventing directional losses.

It is to be understood that the above description applies to female ferrules as well. In particular, the female ferrule has the same geometry as the male ferrule (described above) but lacks the pins. As such, the rocking motion may happen in either of the ferrules.

While a preferred embodiment of the present invention is shown and described, it is envisioned that those skilled in the art may devise various modifications of the present invention without departing from the spirit and scope of the appended claims.

What is claimed is:

1. A ferrule comprising:
   a body having a front end face and an oppositely facing distal face;
   a plurality of optical fibers mounted in said body and disposed in a plane, said optical fibers terminating at said front end face; and
   a pair of passageways in said body, each extending from said front end face towards said distal face, each said passageway having a first forward region with first and second opposite ends, and a second rear region with first and second opposite ends, the first end of the first forward end being proximate to said front end face, the second end of the second rear region being proximate to said distal face, and the second end of said first forward region being proximate to the first end of said second rear region, wherein a cross-sectional dimension of said second region of said passageway tapers continuously radially between said first and second opposite ends of said second rear region;
   said passageways being configured to receive an alignment pin having a cross-sectional pin dimension selected to form a sliding fit with said first region and permit rocking movement of the alignment pin in said second region.

2. The ferrule of claim 1, wherein said pair of guide holes are disposed in said plane.

3. The ferrule of claim 2, wherein said at least one optical fiber is disposed between said pair of guide holes.

4. The ferrule of claim 3, wherein the passageway has a predetermined length, and the first region is approximately one-fourth of the predetermined length of the passageway.

5. The ferrule of claim 1, wherein said ferrule has a length in an axial direction of said optical fibers and said second rear region tapers along a taper length of at least ∕1;2 the length of said ferrule.

6. A ferrule comprising:
   a body having a front end face and a distal end face;
   at least one optical fiber mounted in said body, said at least one optical fiber terminating at said end face;
   a pair of guide holes, each said guide hole defining a passageway through said body, said passageway extending from said front end face towards said distal end face, each said passageway including a first region proximate to said front end face and a second region extending from a first end of the second region proximate said first region to a second end of the second region proximate said distal end face, wherein the second region continuously tapers between the first end thereof and the second end thereof such that a cross-sectional dimension at said second end is greater than a cross-sectional dimension at said first end of said second region; and
   a guide pin positioned in each guide hole, each guide pin having a cross-sectional pin dimension selected to form a sliding fit with its respective guide hole in said first region and to provide clearance between said guide pin and said passageway in said second region, whereby each of said guide holes receives and passes one of said pair of guide pins therethrough and engages said one of said pair of guide pins in a sliding fit in said first region and provides clearance for said one of said pair of guide pins in said second region to permit the ferrule to rock relative to the guide pins to reduce any gap between the front end face of said ferrule and a front end face of the mating ferrule.

7. The ferrule of claim 6, wherein said at least one optical fiber comprises a plurality of optical fibers and said plurality of optical fibers are disposed in a plane.

8. The ferrule of claim 7, wherein said pair of guide holes are disposed in said plane.

9. The ferrule of claim 8, wherein said at least one optical fiber is disposed between said pair of guide holes.

10. The optical connector of claim 6, wherein said ferrule has a length in an axial direction of said optical fiber and said second region tapers along a taper length of at least ∕1;2 the length of said ferrule.

11. The ferrule of claim 6, wherein the passageway has a predetermined length, and the first region is approximately one-fourth of the predetermined length of the passageway.

12. A ferrule comprising:
   a body having a front end face and an oppositely facing distal face;
   at least one optical fiber mounted in said body, said at least one optical fiber terminating at said front end face;
   a passageway in said body extending from said front end face towards said distal face, said passageway having a first forward region with first and second opposite ends, and a second rear region with first and second opposite ends, the first end of the first forward end being proximate to said front end face, the second end of the second rear region being closer to said distal face than the front end face, and the second end of said first forward region being proximate to the first end of said second rear region, wherein a cross-sectional dimension of said second region of said passageway tapers continuously radially between said first and second opposite ends of said second rear region; and
   an alignment pin having a cross-sectional pin dimension selected to form a sliding fit with said first region, said passageway receiving and passing said alignment pin therethrough and engaging said alignment pin in a sliding fit in said first region and permitting rocking movement of said alignment pin in said second region.

13. The ferrule of claim 12, wherein the passageway has a predetermined length, and the first region is approximately one-fourth of the predetermined length of the passageway.

14. The ferrule of claim 12, wherein the first and second opposite ends of said second rear region each have a cross-sectional dimension and the cross-sectional dimension of said second end is greater than the cross-sectional dimension of the first end.

15. The ferrule of claim 12, wherein said ferrule has a length in an axial direction of said optical fiber and said second rear region tapers along a taper length of at least ∕1;2 the length of said ferrule.

16. The ferrule of claim 12, wherein said at least one optical fiber comprises a plurality of optical fibers and said plurality of optical fibers are disposed in a plane.

17. The ferrule of claim 16, wherein said passageway is disposed in said plane.

* * * * *